No. 879,244.

PATENTED FEB. 18, 1908.

G. H. CHAPEL.
EYEGLASSES.
APPLICATION FILED JULY 16, 1906.

—WITNESSES.—
O. B. Baenziger
I. G. Howlett

—INVENTOR.—
George H. Chapel
By E. H. Wheeler & Co. Attys.

UNITED STATES PATENT OFFICE.

GEORGE H. CHAPEL, OF HOWELL, MICHIGAN.

EYEGLASSES.

No. 879,244.   Specification of Letters Patent.   Patented Feb. 18, 1908.

Application filed July 16, 1906. Serial No. 326,303.

*To all whom it may concern:*

Be it known that I, GEORGE H. CHAPEL, a citizen of the United States, residing at Howell, in the county of Livingston, State of Michigan, have invented certain new and useful Improvements in Eyeglasses; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to eyeglasses, and consists in the construction and arrangement of parts hereinafter fully set forth and pointed out particularly in the claims.

The object of the invention is to construct lens mountings for eyeglasses in a simple, compact and inexpensive manner wherein the arrangement is such as to effect a spring joint between the bridge and lens-brackets, which will permit of a movement of the lenses in the plane of vision and which will automatically return said lenses to alinement upon adjustment upon the nose, and wherein the nose-guards are rigidly secured to and made movable with the lens-brackets to allow of the spreading of said guards for placement upon the nose by a movement of the lens-brackets upon said spring joint, the nose-guard or plaquettes being formed of thin, resilient material and having a bearing surface to enable them to cling to the nose so as to hold the eyeglasses in place, and at the same time to yield sufficiently to allow the lenses to return into alinement by the action of the spring joints between the nose-bridge and lens-brackets when the lenses are released in the act of placing the eyeglasses in position.

The above object is attained by the structure illustrated in the accompanying drawing, in which:—

Figure 1:
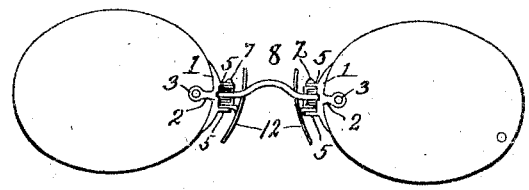
Figure 2:
Figure 4:
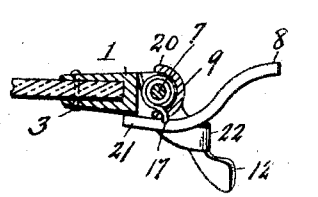
Figure 3:
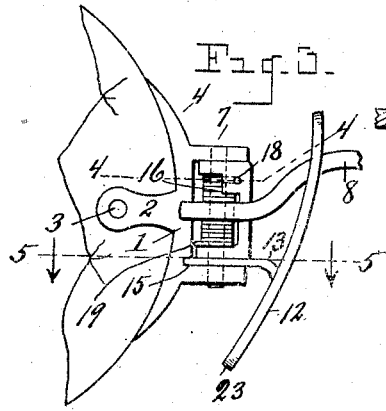
Figure 5:
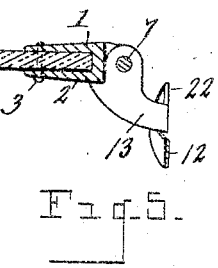
Figure 6:
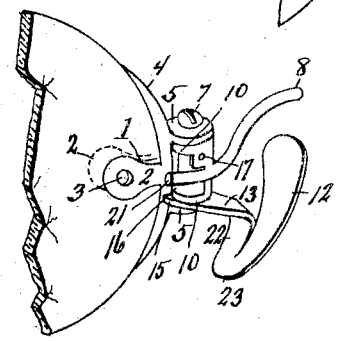
Figure 7:
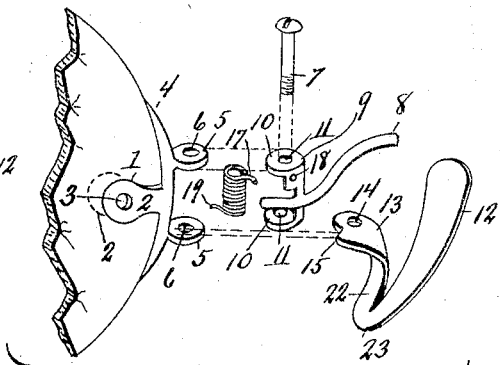

Figure 1 is an elevation of the mountings for eyeglasses involving my invention, the lenses showing in position therein. Fig. 2 is a plan view of Fig. 1, showing the movement of the lenses in the plane of vision upon the spring-joints connecting the lenses with the nose bridge. Fig. 3 is an enlarged fragmentary view in elevation showing one of the mountings and a portion of a lens. Fig. 4 is a horizontal section as on line 4—4 of Fig. 3. Fig. 5 is a similar section as on line 5—5 of Fig. 3. Fig. 6 is a perspective view of the structure shown in Fig. 3. Fig. 7 is a perspective view of the parts shown in Fig. 6 disassembled.

Referring to the characters of reference, 1 designates the lens-clamps provided with the projecting parallel ears 2 which embrace the sides of the lenses and are provided with the registering apertures 3 through which a screw is passed to secure the lenses therein, said lens-clamps are also provided with curved guards 4 which receive the elliptical ends of the lenses, and with the laterally extending brackets 5, which, although in parallel relation, are spaced some distance apart and are provided with the registering apertures 6 adapted to receive the pivot-screw or pintle 7.

The nose bridge 8 is arched to properly fit the nose and is provided at each of its ends with a bracket 9 which stands nearly at right angles to the bridge at the point of connection between said parts, and is provided at its terminals with the laterally projecting ears 10 adapted to lie between the brackets 5 of the corresponding lens-clamp, said ears being provided with the registering apertures 11 through which passes the threaded pintle 7 that also passes through the apertures 6 of said brackets 5, whereby a jointed union is effected between the lens-clamps and the nose-bridge which permits the lenses to swing in the plane of vision, as shown by dotted lines in Fig. 2, but which holds them against vertical movement upon the bridge with respect to said plane.

The nose guards or clamps 12 which are adapted to engage the sides of the nose to hold the eye glasses in position, are formed of light, spring metal, and are each provided with a short horizontal shank 13 having an aperture 14 therethrough, and having a projecting shoulder 15. The horizontal shank of said guard or nose clamp is adapted to lie upon the lower bracket 5 of the lens clamp, the aperture 14 therethrough registering with the aperture 6 in said bracket, and the shoulder 15 engaging the side of said clamp, whereby when the screw or pintle 7 is passed through the aperture 14 into the lower bracket 5, said nose guard is securely locked to the lens clamp and is caused to move therewith. Extending from the horizontal shanks of each of the nose guards or clamps is a downwardly extending curved portion 22 which is connected by a return bend 23 with the upwardly extending curved clamping portion 12 of said clamp, making a very soft, resilient spring calculated to conform to the shape of the nose and to cling yieldingly thereto.

To render the joint between the lens clamp and nose guard spring-actuated, a coiled spring 16 is employed which surrounds the pintle 7 between the ears 10 of the bridge bracket 9, one end 17 of said spring entering the aperture 18 in said bracket and the other end 19 engaging the side of the lens clamp, whereby as the lenses are swung forward, upon the hinged connections which unite them with the bridge, to open the guards or nose clamps, a contraction of the springs 16 will be effected, whereby upon the release of the lenses, the tension of said springs will be exerted to swing the lenses back into alinement and carry the nose guards against the sides of the nose. Because of the resiliency of the spring metal nose guards or clamps, they will yield sufficiently to permit the lenses to return into proper alinement through the pressure exerted by the springs 16, but at the same time will grip the sides of the nose sufficiently to maintain the glasses in place, the flexibility of said clamps permitting them to adjust themselves to the nose without forcing the lenses out of proper transverse alinement, making a simple, compact and serviceable structure.

Upon the outer side of each of the bridge brackets 9 is a lug 20 adapted to engage the side of the lens clamp when the lenses are swung forward to open the nose guards for adjustment upon the nose, preventing the lenses being swung too far. Upon the inner side of each of the bridge brackets is a projecting finger 21 which engages the inner face of the associated lens clamp to prevent the lenses being swung inwardly too far when the glasses are not in use.

Having thus fully set forth my invention, what I claim as new and desire to secure by Letters Patent, is:—

1. In eyeglasses, the combination of a rigid bridge, lens clamps connected to the ends of the bridge by means of hinged joints, springs at said hinged joints for returning the lenses into alinement, nose guards rigidly secured upon and movable with the lens clamps, said nose guards being formed of thin, spring metal, and each having a freely projecting upwardly curved resilient end portion with a flat bearing face, said upwardly curved portions of the guards being so thin and of such resultant flexibility as to conform to the contour of the sides of the nose and to yield against the action of the springs at said hinged joints.

2. The combination of the lens clamps having horizontally projecting brackets, the bridge having brackets at its ends provided with horizontal ears which lie between the brackets of the lens clamps, a vertical spring lying between the horizontal ears of each of the bridge brackets, one end of each spring secured to its respective bracket, and the other end of each spring engaging its respective lens clamp, threaded pintles passing through the brackets of the lens clamps, the ears of the bridge brackets and said springs, and nose guards of thin, resilient material having horizontal stems which also receive said threaded pintles, and which are each provided with a shoulder that engages its respective lens clamp, whereby said guards are rigidly locked to said clamps.

In testimony whereof, I sign this specification in the presence of two witnesses.

GEORGE H. CHAPEL.

Witnesses:
WILLIS L. LYONS,
ELLA T. CRAWFORD.